July 28, 1964     F. HERZEGH     3,142,327
PNEUMATIC TIRE AND METHOD OF MAKING THE SAME
Original Filed May 31, 1955     3 Sheets-Sheet 1
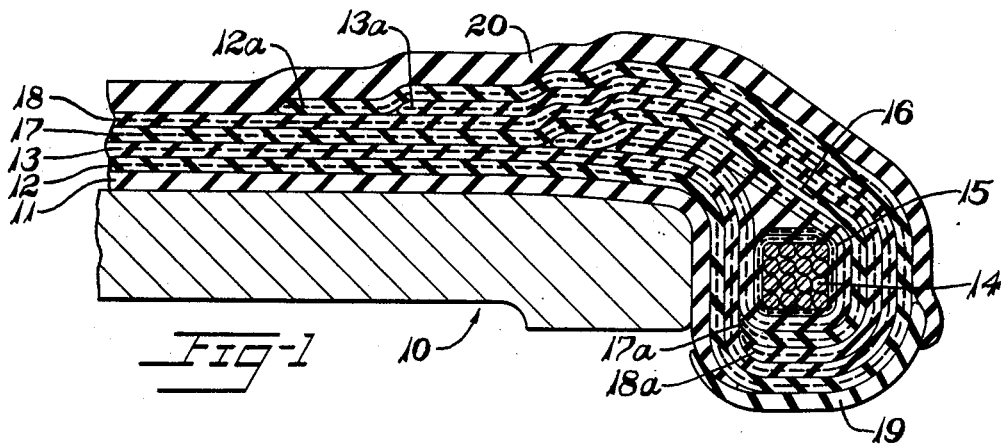
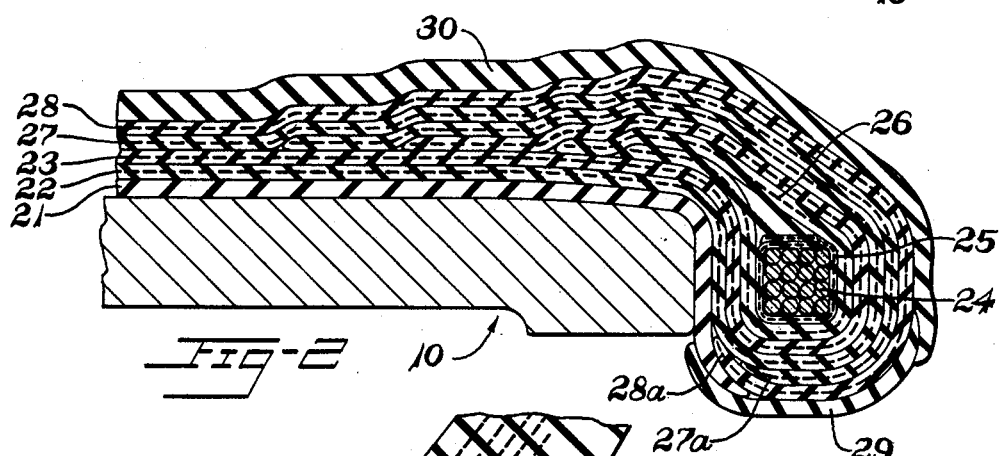
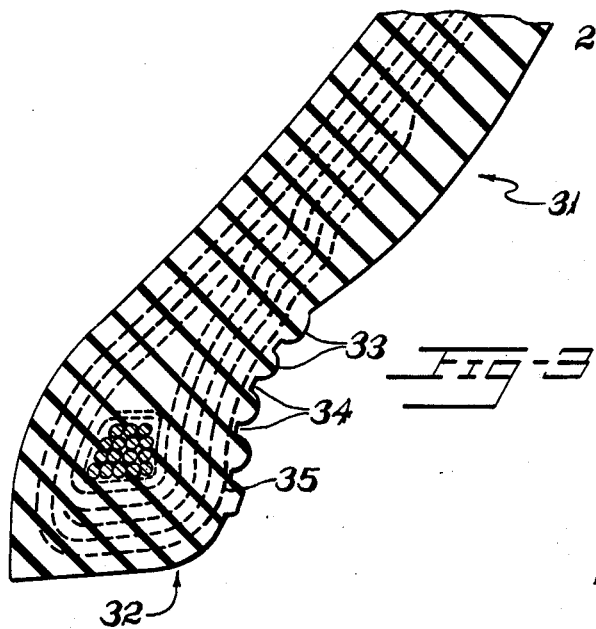
INVENTOR.
FRANK HERZEGH
BY
ATTY.

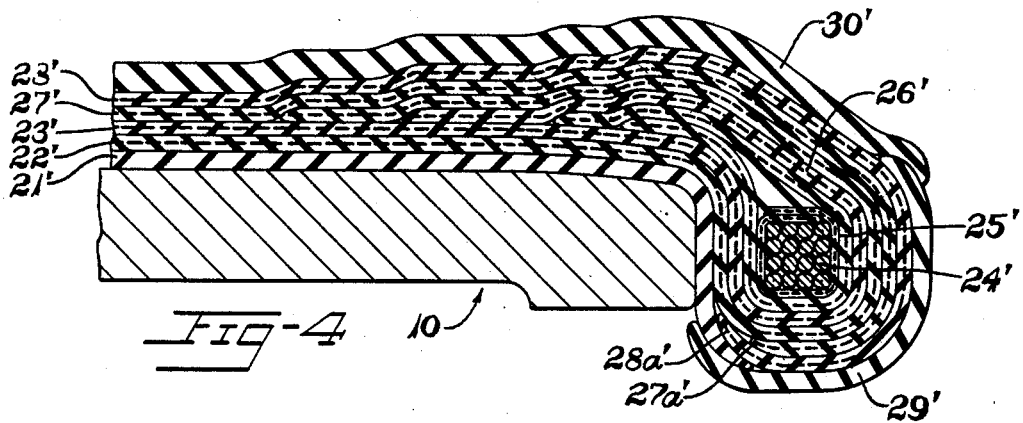
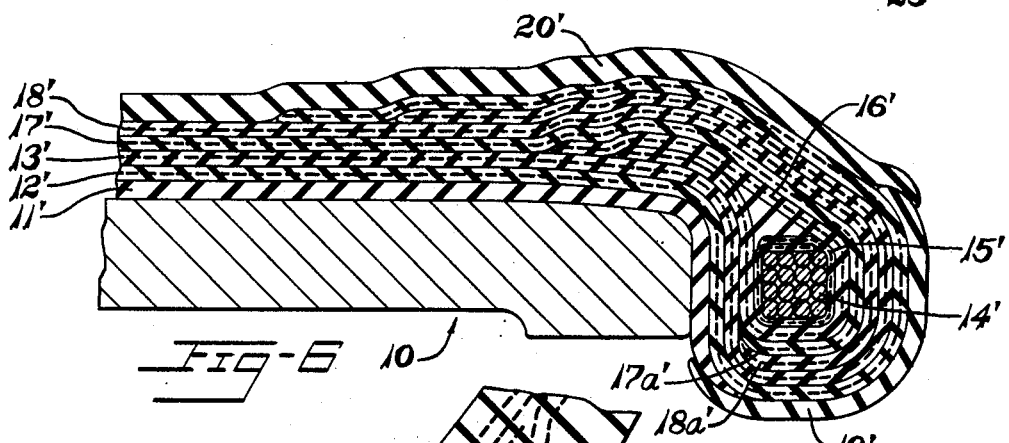
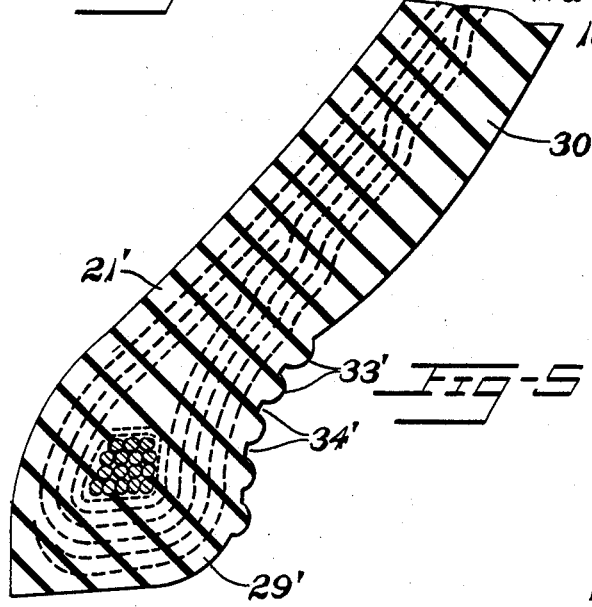

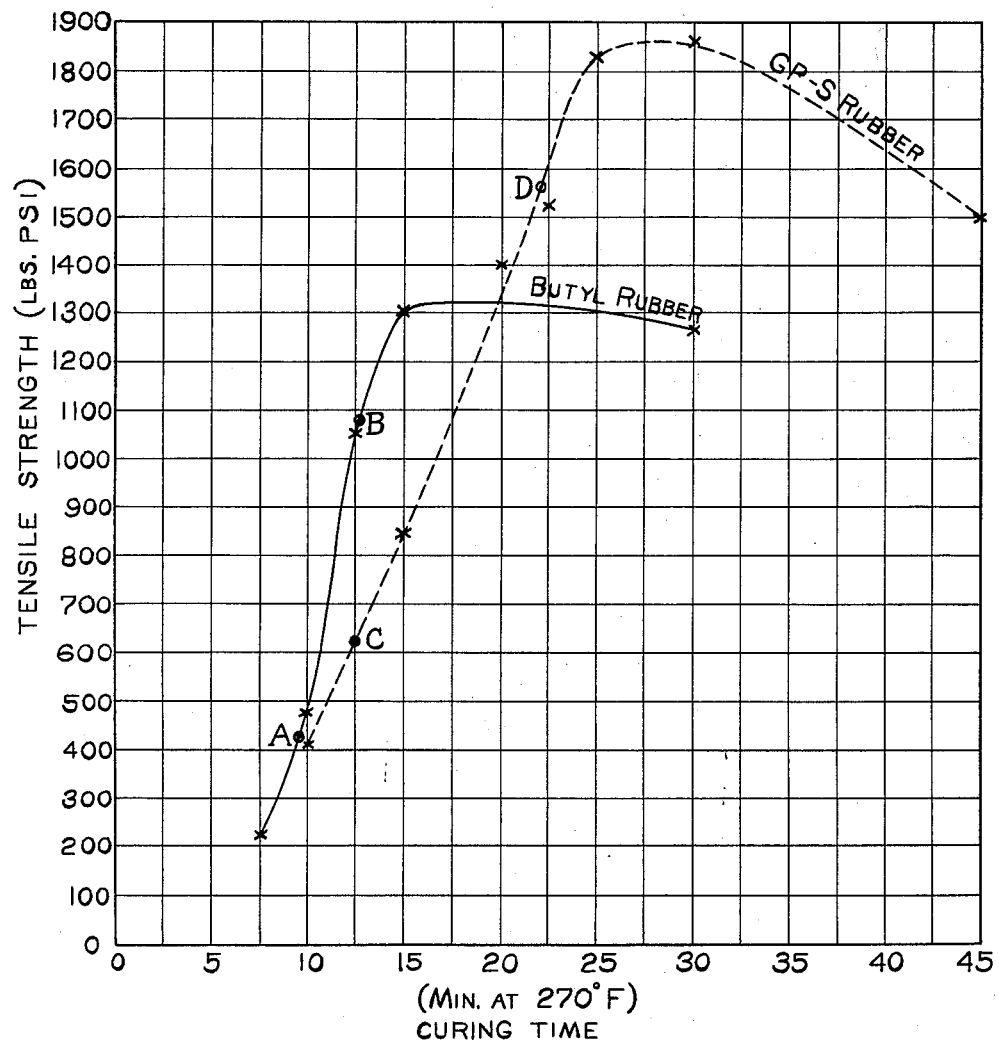

United States Patent Office 3,142,327
Patented July 28, 1964

3,142,327
PNEUMATIC TIRE AND METHOD OF
MAKING THE SAME
Frank Herzegh, Shaker Heights, Ohio, assignor to The
B. F. Goodrich Company, New York, N.Y., a corporation of New York
Continuation of application Ser. No. 512,109, May 31, 1955. This application May 2, 1961, Ser. No. 107,625
10 Claims. (Cl. 152—362)

This invention relates to improvements in pneumatic tires and methods of making the same which, although not limited thereto, are especially applicable to tires adapted to be employed without inner tubes. This application is a continuation of my copending application Serial No. 512,109, filed May 31, 1955, now abandoned.

Expeience in the operation of tubeless tires has shown that it is desirable to prevent the cords or fabric used as reinforcement in the tire body from being exposed at any location which is subjected to air, liquid or the like that is employed as the inflation fluid. Therefore, such tires are commonly made by forming a layer or liner of substantially air-impervious material, such as Butyl, GR-S, neoprene, natural rubber or mixtures thereof, on the interior of the tire carcass. In order to provide an impervious cover for the beads of the tire, this liner is frequently carried around the bead toes. However, the temperatures and pressures employed during vulcanization result in the uncured rubber compounds becoming quite fluid as compared to their plasticity at tire building temperatures. This somewhat fluid condition coupled with the movement of the materials under the shaping and molding pressures frequently cause the reinforcing cords to be exposed in the bead regions of the tire. Moreover, even when the cords are not completely exposed during the curing operation they move so near the surface of the rubber covering as to frequently be exposed when being placed on the tire rim or shortly after beginning service thereon. Such exposed cords provide paths for the inflation fluid to penetrate into the body of the tire, resulting in ply separation and/or other conditions which produce premature tire failure.

The problem of cord exposure in the bead regions of a tire is particularly acute with a form of plylock, or disposal of the edges of the ply cords, in which one or more reinforcing plies terminate near the bead toe of the tire. This type of plylock is, however, very desirable because it facilitates building operations and results in a tire having good bead and sidewall characteristics in other respects. In fact, this plylock is employed in the majority of tires which are intended to be utilized with an inner tube. In such tires it is also common practice to employ a fabric chafer or finishing strip in each of the bead regions to aid in retention of the ply ends in proper position during curing and to protect the beads from abrasion and the like while in use. The conventional chafer or finishing strip, however, cannot be used in a tubeless tire, since the cords of such a strip frequently are exposed during curing or soon after the tire is placed in service and thus provide paths for loss of air from the interior of the tire, both to atmosphere and to the interior of the carcass body, the latter being the more serious since it causes premature tire failure.

The omission of the chafer or finishing strips allows greater freedom of movement of the ply cords in the bead regions during cure so that some of these cords are displaced and frequently exposed. It has, therefore, been necessary to develop a special plylock for tubeless tires to ensure better anchorage of the cord ends and coverage of the bead regions of the tire by the impervious liner material. While this special plylock was a material improvement, nevertheless, the fluidity of uncured rubber under vulcanizing conditions still occasionally results in at least some of the cords in the bead region, being partially exposed or covered by only a skim layer of rubber so that they were readily laid bare, either during mounting on the wheel rim or by slight working or movement of the tire during use. As mentioned above, such exposed cords permit inflation fluid to move from the interior of the tire along the cord fibers and to locations within the tire carcass, or externally thereof, depending upon the particular cords or portion of cords which are exposed.

It has also been found that the highly fluid nature of rubber during the curing operation of a tire sometimes prevents proper formation of the sealing ribs provided on the outer surfaces of the tire beads when the tires are to be used without inner tubes. Thus, the fluid condition of the rubber in this region causes the projections on the tire mold, which will form the grooves between the sealing ribs, to displace the rubber substantially to the surface of the cord ply thereunder, with the result that the tire carcass cords may be exposed to the inflation air of the tire, especially between the innermost sealing ribs.

The principal object of this invention is to provide improved inflatable tires and method of building the same, such that the reinforcing cords remain in compact, closely adjacent relationship about the bead cores during cure and are covered by an adequate thickness of rubber to prevent exposure of the cords during mounting or use of the tires.

Another object of the invention is to provide an improved method of tire building and improved tires produced thereby characterized by the incorporation of a strip of partially vulcanized rubber in each bead region of a tire carcass during the building operation with the extent of precure of the strip being such that it adheres to the uncured reinforcing plies and to the rubber cover of the tire during the building operations, but does not become substantially fluid during the curing operation so that the reinforcing ply cord ends are maintained in proper positions during and following the curing operations.

A further object of the invention is to provide an uncured tire formed of rubber and rubber covered cords with the ends of the latter turned about spaced annuli of substantially inextensible material to form beads and with a strip of partially vulcanized rubber adhered to and covering the outer reinforcing cords in the said beads.

A still further object of the invention is to provide an improved tubeless tire and method of making the same, wherein a carcass of rubber covered cords is covered on the interior by a substantially impervious liner and on the exterior by sidewall and tread rubber, the said cords being turned about substantially inextensible annuli to form spaced beads with the cords held in closely adjacent compact relationship about the said annuli by strips of partially vulcanized rubber placed thereover during the tire building operation and prior to shaping and curing of the tire.

An additional object of the invention is to provide an improved tubeless tire and method of making the same characterized by the provision of improved circumferentially extending sealing ribs on the external surfaces of the tire beads as the result of providing these regions of the tire with strips of partially vulcanized rubber during the building operation and prior to shaping and curing of the tire so that the spaced ribs and intervening grooves are formed in the said partially vulcanized strips which do not become substantially fluid during vulcanization of the tire, whereby a sufficient quantity of rubber remains in these regions to provide complete and well formed ribs and adequate rubber in the intervening grooves to completely cover the reinforcing cords therebeneath.

Another object of the invention is to provide an improved tire and method of building the same wherein a strip of partially vulcanized rubber is applied over the base and outer surface of each bead of the tire prior to shaping and curing of the completed tire, thus constituting a rubber chafer strip in the said completed tire, the tire being provided with spaced circumferentially extending sealing ribs formed in the said partially vulcanized rubber during the completion of the vulcanization thereof and of the tire.

A more specific object of the invention is to provide an improved method of building tubeless pneumatic tires wherein an air-impervious liner and successive layers of rubberized ply cords are disposed in annular configuration with the edges of the ply stock at the sides of the annulus turned about substantially inextensible bead cores, these portions of the annulus being then covered by strips of partially vulcanized rubber adhered to the liner and to the uncured rubber placed over the annulus to form the tread and sidewall covers of the completed tire whereby the ply stock remains completely covered by rubber and in proper position about the bead cores during the subsequent shaping and curing of the annulus regardless of the type of plylock in which the ply cords were arranged about the bead cores.

The invention further resides in certain novel steps of procedure and features of the construction of inflatable tires, and further objects and advantages of the invention will be apparent to those skilled in the art to which the invention pertains from the following description of the presently preferred embodiment thereof, and certain modifications, described with reference to the accompanying drawings, forming a part of this application, and in which:

FIG. 1 is a fragmentary sectional view of a portion of a tire building drum adjacent one edge of the periphery thereof with one bead and the adjacent portion of an uncured tire incorporating an air-impervious liner and the special plylock now employed in the better types of tubeless tires and also having a strip of partially vulcanized rubber incorporated in the bead regions in accordance with this invention;

FIG. 2 is a view similar to FIG. 1, but showing a tire provided with the bead plylock now conventionally employed for tires adapted to be used with tubes, this figure also showing the novel feature of the incorporation of a partially vulcanized rubber strip in the bead region;

FIG. 3 is a section through one bead region of a cured and shaped tubeless tire which has had spaced, circumferentially extending, sealing ribs molded on the external surface of the bead, the figure showing the defects in the sealing rib portion of the tire which frequently occur due to excess fluidity of the rubber in that region of the tire during the curing operation;

FIG. 4 is a view similar to FIG. 2, but showing a tire bead provided with a semi-cured or partially vulcanized strip extending around the bead base and also sufficiently far up the side of the bead to provide for formation therein of the sealing ribs;

FIG. 5 is similar to FIG. 3, but shows the improved sealing ribs formed on a tire built in accordance with the procedure illustrated in FIG. 4;

FIG. 6 is a view similar to FIG. 1 but showing the liner material extending only to the bead toe and the partially vulcanized or cured strip applied about the bead base as well as over the portion which comprises the bead region in which the sealing ribs are formed; and FIG. 7 is a graphic representation of the tensile strength-curing time relationship for two different rubber compositions commonly used in vehicle tires, the solid line being the curve of this relationship for one composition and the broken line being the curve for the other composition.

The method of this invention, and an improved tire produced thereby, will be described first with reference to the construction of a tubeless tire having the edges of the reinforcing cords or plies turned about the bead cores in the special plylock now employed in the better tires of the type adapted to be used without a tube. As indicated in FIG. 1, the tire carcass is built upon a conventional collapsible tire building drum 10, only a portion of one edge of the periphery of which is shown. It will be understood, however, that the drum and the carcass built thereon are symmetrical about the circumferential center line of the drum and that like operations are performed at both sides thereof during the building of a tire. However, only one bead region and one side edge of the tire building drum are here shown and specifically mentioned in order to simplify and facilitate the description.

The procedure employed in building the tire carcass illustrated in FIG. 1 comprises, as a first step, applying an annulus 11 of substantially air-impervious material, such as Butyl-type rubber or the like, upon the cylindrical surface of the tire building drum 10 to form the liner for the interior of the tire. Preferably, the width of this air-impervious liner is such that it will reach substantially only to the bead toes of the completed tire. Hence, the edges of the liner material are shown extending only slightly below the side faces of the drum, one only of which is shown in the drawings, although as mentioned above, it will be understood that the other side face of the drum and of the liner are identical. As here shown, the liner 11 comprises a single convolution or layer of the air-impervious material. It will be understood, however, that, if desired, the liner 11 may be formed of two or more convolutions of the air-impervious material. Also, if desired, the liner material may be calendered on one surface of the first ply of rubberized cord and the composite material placed upon the drum in a single operation.

When the liner material is separately supplied, as just described, the second step in the tire building operation is to place over the layer 11 an annular layer or ply 12 of rubberized cord. This layer or ply is formed of parallel cords of textile fibers, such as cotton, rayon, nylon, or the like, preferably in weftless condition and having rubber calendered thereon, the cords of the ply extending at an angle to the longitudinal center line of the liner and of the tire drum on which the liner and ply are placed. The width of the layer or ply 12 is greater than that of the liner 11, and therefore the edges of the ply extend outwardly beyond the edges of the liner 11 and well beyond the sides of the building drum. Over this first ply or layer 12 of rubberized cord is placed a second layer or ply 13 of like rubberized cord, this second layer or ply having the cords thereof disposed at an angle to the longitudinal center line of the liner and tire drum, and to the cords in the first layer or ply, as will be readily understood by those skilled in tire building. The width of the second layer or ply 13 is somewhat less than that of the first layer or ply 12, but is greater than that of the liner material 11.

The next step in the tire building operation is to apply to the drum 10, at either side face thereof, separate annuli or rings of substantially inextensible material to form bead cores 14. These rings or bead cores are made in the conventional manner and comprise bundles of wires or the like enclosed by a wrapping or cover 15 and provided with strips 16, known as bead flippers, which are disposed about the bead cores with the edges of the strips adhered to each other and to the second ply 13 at a location spaced upwardly from the edge of the latter, as will be apparent from FIG. 1.

After the bead cores 14 have been placed, additional plies of rubberized cord are disposed in superposed relationship upon the previously applied plies and adhered thereto. Thus, a ply 17 of rubberized cord is placed upon the ply 13 and a ply 18 is placed over the ply 17. These additional plies likewise have the cords thereof extending angularly relative to the circumferential line of the drum with the cord direction in successive plies alternating in the conventional manner.

As each of the plies 17 and 18 is placed, the outer edges thereof are turned downwardly and inwardly about the bead cores, as indicated at 17a and 18a in FIG. 1. The tire builder then turns the edges of ply 13 upwardly about the adjacent downwardly turned edges of plies 17 and 18, with the end portion 13a of ply 13 being carried beyond the ends of the flipper 16 and adhered to the outer surface of the ply 18. The edges of ply 12 are then turned upwardly over the turned edges of the ply 13 and with the end 12a of this first layer or ply extending beyond the end 13a of ply 13 and adhered to the outer surface of layer 18. This is possible since it will be remembered that the width of the layer or ply 12 was initially greater than that of the layer or ply 13.

The operations just described result in the formation of an annular tire carcass with substantially inextensible beads at either end thereof and with the interior surface of the annulus formed by the liner or layer 11 of substantially air-impervious rubber. However, the liner or layer 11 does not extend around the tire beads as in prior constructions, but terminates in the regions of the bead toes. The portions of the tire beads extending from the toes and which are subjected to inflation fluid in the completed tire are rendered substantially air-impervious, in accordance with this invention, by applying thereover separate strips 19 of partially vulcanized or precured rubber which, in the final cured state, are substantially impervious to the inflation fluid employed in the tire. The inner edges of the strips 19 are placed in overlapping relationship to the adjacent edges of the liner 11 and adhered thereto by pressing thereon as is customary in adhering other portions of the tire in the building operation. The outer edges of the strips 19 extend to locations on the outer surfaces of the beads adjacent the bead heels of the completed tire and are there united with the edges of the rubber covering 20, which is provided over the carcass and from which the tread and sidewall covers are formed during the molding and shaping of the tire.

The composition of the strips 19 may vary, but in the preferred embodiment, wherein the liner or inner layer 11, is formed of a Butyl-type rubber, the strips 19 are likewise preferably formed of similar composition. However, the strips 19 differ from the liner 11 in that they are partially precured before their incorporation into the uncured tire, the extent of this partial cure or vulcanization being such that the strips retain sufficient adhesiveness to adhere to the uncured liner 11 and to the cover rubber 20 but do not become substantially fluid at the temperatures and pressures employed in the final cure of the tire. The proper amount of partial precure of material for forming the strips 19 to meet these requirements can be readily determined by one skilled in rubber compounding, or in tire building, by stretching a sample by hand and observing the nature of its recovery when the stretching force is released. A stock which readily recovers its initial dimensions in a very brief interval of time has received an excessive partial precure and will not prove satisfactory. On the other hand, a stock which tends to retain its deformed shape when stretched by hand has not been cured sufficiently. Material which has been cured to produce characteristics intermediate these extremes will generally be found satisfactory.

It is of course impossible to provide curing time and temperature data which would be valid for all rubber stocks, since there are many different rubber compounds available and slight variations in the ingredients result in such different curing times and optimum curing temperatures that numerical data is meaningless. However, it can be said that when the curing curves for rubber compositions are plotted, that is, the tensile strength of the stock in pounds per square inch for different curing times at the same temperature, the partial precure of that stock which is satisfactory for use in accordance with this invention is identified as being within the range represented by the portion of the curve between ordinates thereof which are in the nature of one-third and three-fourths of the maximum ordinate. Stated somewhat differently, the partial precure or vulcanization should be such that the strips have not less than one-third or no more than three-fourths of the tensile strength possessed by material of like composition when fully vulcanized.

The following composition is given as an example of one rubber compound which is suitable for the substantially air-impervious, partially vulcanized strips of this invention.

| Material: | Parts by weight |
| --- | --- |
| Natural rubber | 19.64 |
| GR-S rubber | 30.00 |
| Crude Butyl | 10.00 |
| Butyl reclaim | 66.70 |
| Carbon black | 35.00 |
| Sulphur | 1.56 |
| Zinc oxide | 3.00 |
| Stearic acid | 1.50 |
| Accelerator | 1.00 |
| Softeners (oils and resins) | 7.00 |

Samples of this material were cured at 270° F. for differing periods of time and the tensile strength for each of the samples separately measured. The periods of cure and the tensile strengths were as follows:

| Curing time in minutes: | Tensile strength in pounds per sq. in. |
| --- | --- |
| 7.5 | 220 |
| 10.0 | 480 |
| 12.5 | 1060 |
| 15.0 | 1300 |
| 30.0 | 1270 |

This data is shown graphically by the solid line curve bearing the legend "Butyl Rubber" in FIG. 7 of the drawing. On this curve, the points marked "A" and "B" represent the lower and upper limits of the precure or partial vulcanization for this rubber compound, it being observed that the point marked "A" is approximately one-third of the total vertical height or ordinate of the curve, while the point marked "B" is approximately three-fourths of the maximum height or ordinate.

It is to be understood that the aforementioned composition and its curing curve are but exemplary of a rubber composition which may be employed in accordance with this invention. The invention is not, however, limited to use of such a material nor to the time range or temperature of cure given above, since the invention may be utilized with other rubber compositions which will require different temperatures and curing times to produce similar characteristics, as will be readily understood by those familiar with the rubber compounding art. The following, however, may be given as a second example of a rubber compound of different nature which can be employed satisfactorily for the partially vulcanized strips in the construction of a tire having the novel features of this invention.

| Material: | Parts by weight |
| --- | --- |
| GR-S rubber | 59.7 |
| Natural rubber | 40.30 |
| Carbon black | 30.00 |
| Sulphur | 3.00 |
| Mercapto benzothiazyl sulphide | 2.00 |
| Zinc oxide | 3.00 |
| Stearic acid | 1.00 |
| Softeners (oil and resins) | 9.00 |

Samples of this rubber composition were likewise cured at temperatures of 270° F. for differing periods of time and the tensile strength of the samples tested. The curing times and tensile strength thereof were found to be as follows:

| Curing time in minutes: | Tensile strength in pounds per sq. in. |
|---|---|
| 10.0 | 410 |
| 15.0 | 850 |
| 20.0 | 1400 |
| 22.0 | 1520 |
| 25.0 | 1830 |
| 30.0 | 1860 |
| 45.0 | 1500 |

This data is graphically represented by the broken line curve in FIG. 7 on which the points C and D indicate the limit of the range of curing times providing suitable partial vulcanization. That is, strips of rubber of this composition which have been cured at 270° F. for the times indicated by the portion of the curve between the points C and D exhibit the characteristics required for qualification as the partial precured or vulcanized strips of this invention. It will be noted that the points C and D are respectively located at approximately one-third and three-fourths of the maximum height or ordinate of the curve.

A tire constructed as has just been described and having a partially vulcanized strip 19 in each bead region is shaped and cured in the conventional manner, and during the curing the rubber of the cover 20 flows into the cavities of the mold to provide the tread pattern, identifying indicia and other configurations normally provided upon the surface of the tire. The partially vulcanized strips 19 are not, however, in the highly fluid condition of the other rubber in the tire, and hence do not permit the free movement of the cords in the bead region which has been characteristic of curing operations heretofore. Therefore, the ply cords are maintained in compact relationship about the bead cores similar to that in which they were placed during the building operation, and, moreover, the thickness of the rubber over the outermost of the ply cords in the bead region remains substantially the same as that of the thickness of the strip when initially applied. Hence, the cords are not exposed nor can become exposed during normal use of the tire. It is also worthy of note that, since the strips 19 are only partially vulcanized before the tire is cured, and since rubber can be held at tire curing temperatures for a substantial period beyond the normal curing time for tires, the strips 19 are not overcured by the curing of the tire to the extent that the rubber deteriorates in any respect. As a matter of fact, the strips, the liner and the sidewall covers are integrally united in the vulcanized tire as though they were initially one unitary piece of rubber.

The tire construction just described shows the manner in which the teachings of this invention can be incorporated with the special tubeless tire plylock. However, the invention has the advantage that the partially vulcanized or precured strips of rubber employed in the bead regions of a tire makes it unnecessary to employ such special plylock in tires to prevent movement of the ends of the outer ply cords during the vulcanization, and which was the reason for the initial development of the special plylock. That is to say, in addition to ensuring an adequate thickness of rubber in the regions of the bead bases of the tire, the partially precured strips of rubber in that region can also be utilized to hold the ends of the ply cords in proper position about the bead cores so that the conventional plylock employed with tires intended to utilize inner tubes can also be employed for tubeless tires. This is the presently preferred embodiment of the invention and is illustrated in FIG. 2 wherein it will be seen that the tire construction is effected upon the tire building drum 10 by placing thereover a layer or layers of substantially air-impervious material 21 similar to the layer 11 of FIG. 1. Over the layer or liner 21 is then placed a layer of rubber covered ply cords 22, similar to the ply 12 in FIG. 1, and over the ply 22 is placed a layer of rubberized cords 23, the cord angles in layers 22 and 23 alternating in the same manner as described for layers 12 and 13. The bead core annuli or rings 24 are then located adjacent the edges of the tire carcass and at the sides of the tire building drum 10, which cores are formed of substantially inextensible material covered by wrappings 25 and having bead flipper strips 26 which are adhered to the ply stock 23, as will now be apparent from the above description with respect to FIG. 1.

After application of the bead cores and adherence of the bead flippers in this embodiment of the invention, the edges of the plies 23 and 22 are successively turned outwardly and upwardly over the bead cores and flippers and adhered to the outer surface of the ply 23, as will be readily apparent from an inspection of FIG. 2. Next the tire builder places over the ply 23 a third ply 27 of rubberized cord and turns the edges of this ply inwardly over the previously turned edges of the plies 22 and 23, with the inner edges 27a of this ply terminating adjacent the bead toes of the tire carcass. Over the ply 27 is then placed another ply 28 of rubberized cord, the edges of which are turned inwardly about the bead cores with the inner edges 28a of this ply terminating adjacent the bead toes and inwardly of the edges 27a of the previous ply. It will be understood that the cords in the plies 27 and 28 are bias laid, that is, have their cords disposed at angles relative to the longitudinal center line of the drum and that the directions of the cords in the successive plies alternate, as in customary in the tire building art.

This construction comprises the plylock which is sometimes known in the art as "conventional" and which has been used for tires intended for use with inner tubes. However, since the tire illustrated in FIG. 2 is intended for use without an inner tube, it is important that the inner edges 27a and 28a of the third and fourth plies be held closely adjacent the plies 22 and 23 and compactly about the bead cores during the subsequent curing operation so that these ply ends will not protrude through the rubber in this region of the tire, which is in highly fluid condition during the curing operation. To accomplish this desired result, the bead regions of the tire are each now provided with a separate strips of partially vulcanized or precured rubber 29, the inner edges of which are adhered to the liner material 21, and the outer edges of which are adhered to the covering rubber 30, that is applied over the tire carcass to form the tread and sidewalls in the completed tire. The extent of precure of the strips 29 is of the same order as that of the strips 19 and hence the details thereof need not be again repeated, it being important only to again notice that the condition of the strips is such that they have sufficient tackiness to facilitate incorporation in the uncured tire and do not become appreciably fluid during the curing operation.

The uncured tire shown in FIG. 2 is then removed from the building drum 10 and placed in the conventional apparatus for shaping and curing the tire, at which time the tread pattern and other markings and indicia upon the tire are formed. During this period, the partially precured strips 29, however, do not become appreciably fluid, and therefore retain sufficient strength to hold the ends of the plies 27 and 28 in their closely compact relationship with respect to the bead cores, and provide an adequate covering of rubber over the outermost cords. This can be observed in the vulcanized tire by taking a section through a bead region. Hence, this construction permits the use of the conventional plylock for tubeless tires which is advantageous not only because it reduces the tire building time, but also because there is some saving in ply stock as well as providing a bead region which has characteristics which are more desirable in some respects than that provided by the special plylock.

An inflatable tire which is intended to be used without an inner tube must have some means by which the spaced beads of the tire can be sealed to the rim of the wheel with which the tire is used to provide an air-tight chamber for the inflation fluid. This is conventionally effected in the usual tubeless tire by providing a plurality of spaced, circumferentially extending ribs and intervening grooves on the outer side face of each of the bead regions of the tire. Thus, as will be apparent from FIG. 3, which shows a section through one bead region of a tubeless tire 31, the outer surface of the bead region 32 of the tire is provided with the plurality of circumferentially extending sealing ribs 33 and intervening grooves 34. These ribs and grooves are provided in the rubber covering of the tire during the molding and vulcanization operation by suitable projections and recesses in the mold in which the uncured tire is placed. During this formation of the sealing ribs the rubber in the bead regions of the tire is in highly fluid condition, and the pressures used in curing are such that the rubber in this region is frequently displaced excessively from the portion of the mold in which the ribs and grooves should be formed to the extent that only a skim covering of rubber is provided at the bases of the grooves 34, so that the cords in the underlying ply 35 of the tire are either exposed or are easily laid bare and exposed during mounting or use of the tire.

This difficulty with respect to maintaining an adequate rubber layer at the bases of the grooves 34 is particularly acute in the lowermost groove or grooves, and it is just at this point that it is most important for the rubber covering to be adequate, since it is the lower rib or two of the tire which effect the major portion of the sealing against the inflation pressure, so that the lower groove is likely to be subjected to at least a part of that pressure. In addition to deficiences of rubber in the grooves 34 between the ribs 33, it also sometimes happens that the ribs themselves are improperly formed due to the previously mentioned highly fluid condition of the rubber. Thus, as will be apparent from FIG. 3, the lowermost rib 33 may be incompletely formed by having omitted or flattened portions at various locations thereabout due to the fact that the rubber did not properly fill this portion of the mold or was forced therefrom while in the highly fluid condition during curing. These difficulties have either required expensive manual repair of the bead regions or else, when they have gone unnoticed, have resulted in premature failure of the tire, both of which are, of course, undesirable.

In accordance with this invention, the aforementioned difficulties in securing properly formed sealing ribs and adequate rubber in the intervening grooves between the ribs can be obviated by employing in this region of the tire a strip of partially vulcanized rubber so that the sealing ribs and intervening grooves are formed in this material that is not highly fluid under vulcanizing conditions. Consequently, the rubber remains in the proper locations in the mold to form adequate sealing ribs and sufficient rubber at the bottoms of the intervening grooves to properly cover the underlying cords. One manner in which this may be achieved is indicated in FIG. 4, wherein it will be observed that a tire is built employing the same arrangement of plies and order of turning of the edges of the plies about the bead cores as is employed in the embodiment shown in FIG. 2. This, therefore, constitutes the so-called "conventional" plylock and like reference numerals have been employed in FIG. 4 for the parts which are similar to those in FIG. 2, with the addition of a prime mark thereto. The bead region of the tire shown in FIG. 4, however, has the partially vulcanized strip 29' thereof of greater width than the strip 29 employed in FIG. 2, and the cover material is correspondingly shorter. Specifically, each partially vulcanized strip 29' extends from a region in the vicinity of the bead toe to a position well up on the outer side of the bead to a location slightly above that in which the sealing ribs of the tire are normally provided. The rubber cover 30' meets and is adhered to the outer edge of the strip 29'.

A tire constructed in accordance with the showing in FIG. 4 will have the same characteristics as those of the tire illustrated in FIG. 2 and, in addition, will have fully formed sealing ribs and intervening grooves as the result of having these elements formed in the partially prevulcanized strips 29' which do not flow from these regions of the mold, thereby causing a deficiency of rubber therein, as is frequently the case when uncured rubber is utilized in these locations. FIG. 5, which is a section through the vulcanized bead of a tire that has been built in the manner illustrated in FIG. 4, shows the retention of the ply ends in compact relationship about the bead cores, the completely formed sealing ribs and the intervening grooves with sufficient rubber to adequately cover the cord regions therebeneath that result from use of the partially vulcanized strips 29'.

FIG. 6 shows a still different embodiment of the invention wherein the partially vulcanized strips are provided in sufficient width to extend over the bead bases and the portions of the outer sides of the beads where the sealing ribs are formed, these strips being applied to a tire employing the special tubeless tire plylock of the type illustrated in FIG. 1. Therefore, the several layers or plies of material are identified in FIG. 6 by the same numerals as utilized in FIG. 1 but with prime marks applied thereto. Since the mode of assembling these several layers of material to form the tire are identical with those utilized in building the tire shown in FIG. 1, the description of the steps of placing upon the drum 10 the several layers of rubber ply stock and the bead cores need not be repeated. It is sufficient here to note that, since the strips of partially vulcanized rubber 19' are wider than the strips 19, the width of the rubber cover 20', which is to form the tread and sidewall covers of the completed tire, is correspondingly narrower so that the lower edge of this cover material extends to a location just above the region of the tire in which the air sealing ribs are formed. The edges of the partially vulcanized strips 19' are adhered to the liner material 11' in the vicinity of the bead toes and to the cover material 20' at the location above the region of the said sealing ribs. A tire thus constructed is removed from the building drum, molded, and cured in conventional manner whereupon it will be found to not only have the improved characteristics explained above with respect to a tire constructed in accordance with the first described embodiment but, in addition, will also have more uniformity in the sealing ribs as has been explained with respect to FIGS. 4 and 5.

It will now be apparent that, in accordance with this invention, it is now possible to build a tire in which the reinforcing cords in the bead regions are held in compact closely adjacent relationship about the bead cores without the need of a fabric finishing or chafer strip. Moreover, the bead regions of the tire are provided with sufficient quantity of rubber over the cords so that the latter are not exposed, or nearly exposed, during the curing operation, and, therefore, cannot form air-wicking paths for the air contained in the tire when the latter is employed without a tube. The improved mode of construction tires and the improved tires resulting therefrom preferably have the composition of the partially vulcanized strips so chosen that the said strips have a high air-impervious value equivalent to that utilized in the liner material such as 11 and 21. The strips may also have included in their composition materials which impart good abrasion resistance, as is well known in the art, so that the said strips can be said to provide an air-impervious rubber chafer or finishing strip. It will be apparent that the specific composition employed in forming the strips such as 19, 29, 19' and 29' is not, per se, a part of this invention, since the composition will be selected in accordance with the desired characteristics to be incorporated in the completed tire. The essence of this invention is, therefore, not in the compositions employed but in the fact that the rubber compounds, whatever their compositions, are partially vulcanized prior to the preparation of the strips in the raw or uncured carcass so that the rubber of these strips remains in place in the mold during the curing operation and does not become substantially fluid so that it can be pushed or caused to flow away from the desired location.

Although the improvement in forming sealing ribs and intervening grooves has been described with reference to employing partially vulcanized strips so located as to extend from the bead toes of the completed tire across the bead bases, around the bead heels and up onto the outer sides of the beads, it will nevertheless be apparent that this feature of the invention can be achieved by employing the partially vulcanized strips in the uncured tire only in the region of the side surfaces of the beads where the sealing ribs are to be formed. That is to say, in some instances, the liner material such as 11 can be carried beyond the bead toe and outwardly to the vicinity of the bead heel, as in present tubeless tire constructions, with the partially vulcanized strips such as 19 extending from the vicinity of the bead heel upwardly over the outer surface of the bead to a location similar to the upper edges of the strips as shown in FIGS. 4 and 6.

It will also be apparent that, although the invention has been described primarily with reference to its use in making tubeless tires and to the improved characteristics of such tires made in accordance with the methods of this invention, nevertheless, these methods may be advantageously utilized in forming tires which are intended for use with inner tubes. In such tires it is, of course, not customary to provide an inner air-impervious liner such as 11 or 21. The partially vulcanized strips, such as 19, 19', 29 or 29' will, however, be applied to the bead regions of the tire substantially as shown in the drawings, such strips being utilized in place of the usual chafer or finishing strip formed out of fabric. As a result, the ply cords will be held in proper relationship about the bead cores during the curing operation, and, in addition, the cords will be covered by an adequate layer of rubber in the cured state of the tire so that the cords do not become exposed during mounting or use of the tire.

The invention has been here illustrated and described as applied in the building of 4-ply tires of the type normally employed for passenger type vehicles. It will be evident, however, that the invention is not so limited but may be utilized in building tires of other sizes and for other purposes than for passenger vehicles. Likewise, although the invention has been primarily described with reference to inflatable tires wherein the inflation fluid is air, it will be evident that in certain instances other inflating fluids may be employed such as water or other liquids as is frequently the custom with tractors and other types of heavy equipment.

It will be further apparent that the essence of the invention may be utilized while making certain variations or modifications from the specific steps of procedure here disclosed and illustrated. For example, the application of the partially vulcanized strips has been shown and described as being effected while the annulus is on the tire building drum and before the rubber cover is applied. It will be apparent, however, that such partially vulcanized strips may be applied after the cover material such as 20 is applied with the partially vulcanized strip adhered to the said cover. This change in the order of applying the strip with respect to the application of the cover material will make no difference in the completed tire, since the several strips of rubber will unite and become substantially integral during the curing operations. Finally, it should be noted that, in performing the steps of this invention, the tire builder may utilize other known procedures to facilitate his operations, such as, for example, the application of solvents, lubricants, or even liquid adhesives to various components prior to or during assembly of the several parts of the tire. These and other well known steps have not been mentioned during the description of the steps of the preferred embodiment and the modifications of the invention, since they will be readily understood by those skilled in the tire building art and may be employed as is deemed necessary or desirable. Consequently, the invention is not to be construed as limited to the specific compositions and steps of procedure as here illustrated and described except as is required by the spirit and scope of the subjoined claims.

Having thus described the invention, I claim:

1. An uncured pneumatic tire comprising a carcass of cord-reinforced uncured rubber terminating in spaced bead portions with a partially vulcanized rubber strip extending across the base of each bead portion externally of the reinforcing cords therein, the extent of vulcanization of said strips being such that their tensile strength is not less than one-third nor more than three-fourths that possessed by fully vulcanized strips of the same composition.

2. An uncured pneumatic tire comprising a plurality of plies of uncured rubber-coated reinforcing cords terminating in spaced bead regions, a layer of substantially air-impervious rubber on the interior of said carcass extending to the toe portions of said bead regions, uncured rubber covering the exterior of said carcass and extending to the heel portions of said bead regions, and a partially vulcanized strip of rubber extending across the base of each bead and joined to the adjacent edges of the rubber on the interior and exterior of the carcass, the extent of vulcanization of said strips being such that their tensile strength is not less than one-third nor more than three-fourths that possessed by fully vulcanized strips of the same composition.

3. A pneumatic tire comprising a rubber tread portion surmounting an annular carcass formed by a plurality of plies of rubber-coated reinforcing cords and spaced bead cores about which the said plies are turned to form bead regions with at least some of the edges of said plies terminating in the bases of said bead regions and held in compact rubber-covered relationship by rubber finishing strips applied to the external surfaces of said bead regions in partially vulcanized condition prior to vulcanization of the tire, the extent of partial vulcanization of said strips being such that prior to vulcanization of the tire the strips possess not less than one-third nor more than three-fourths of the tensile strength of fully vulcanized material of like composition.

4. A tubeless pneumatic tire comprising a rubber-covered cord reinforced annular carcass terminating in spaced bead regions the external sides of which are provided with circumferentially extending sealing ribs with circumferentially extending grooves therebetween characterized by the reinforcing cords axially inwardly of said grooves being covered by a layer of rubber of appreciable and substantially uniform thickness resulting from the molding of said ribs and grooves during vulcanization of the tire in strips of partially precured rubber applied to the uncured tire prior to vulcanization thereof with the extent of partial precure of said strips being such that they possess not less than one-third nor more than three-fourths of the tensile strength of fully cured material of like composition.

5. In the method of making a pneumatic tire the steps comprising placing a separate strip of partially vulcanized rubber material circumferentially about the external surface of each bead region of an uncured, rubber-covered, cord-reinforced tire with spaced beads and thereafter vulcanizing the tire, the extent of vulcanization of said partially vulcanized strips being such that they have not less than one-third nor more than three-fourths of the tensile strength possessed by fully vulcanized material of like composition.

6. In the method of making a tubeless pneumatic tire the steps comprising, providing a carcass of rubber-coated cords terminating in axially spaced bead regions and having an air-impervious layer of rubber on the interior of the carcass extending to the vicinity of the toes of the bead regions, placing a separate strip of partially vulcanized rubber material circumferentially about each of said bead regions externally of the cords in said regions with the inner edges of the strips joined to the said layer and with the outer edges of the strips extending to the regions of the heels of the bead regions, the extent of vulcanization of said strips being such that they have not less than one-third nor more than three-fourths of the tensile strength possessed by fully vulcanized material of like composition, applying tread and sidewall rubber material to the carcass, joining the sidewall material to the outer edges of the strips, and then vulcanizing the tire.

7. In the method of making a tubeless pneumatic tire the steps comprising providing a carcass of rubber-coated cords terminating in axially spaced bead regions, the said carcass having an air-impervious layer of rubber on the interior extending to the toes of the bead regions, placing a separate strip of partially vulcanized rubber material circumferentially about each of said bead regions externally of the cords in said regions with the inner edges of the strips joined to said layer and with the outer edges of the strips extending over the bead heels to locations on the external sidewalls of the carcass above the region engaged by the flanges of a wheel rim on which the tire is adapted to be mounted, the extent of vulcanization of said strips being such that they have not less than one-third nor more than three-fourths of the tensile strength possessed by fully vulcanized material of like composition, applying tread and sidewall rubber to the exterior of said carcass with the edges of the sidewall rubber joined to the outer edges of said strips, and then vulcanizing the tire and molding circumferentially extending sealing ribs in the said portions of said strips which are adapted to engage the flanges of a wheel rim.

8. The method of making a pneumatic tire comprising forming an annular carcass by sequentially placing on a tire building drum circumferentially extending layers of rubber-covered cord ply stock, placing an annulus of inextensible material on each end of said annular carcass to provide bead cores in the completed tire, turning the edges of the ply stock about said bead cores to provide a ply lock in the bead regions of the tire, applying over the exterior of each of the bead regions a separate strip of partially vulcanized rubber material compatible with the rubber of said ply stock and having a tensile strength of at least one-third and not more than three-fourths of the tensile strength possessed by fully vulcanized material of like composition, applying a rubber covering over the exterior of said carcass with the edges of the covering extending to and joined with said strips in locations adjacent the bead regions, removing the uncured tire from the drum, and vulcanizing the tire.

9. The method of making a tubeless pneumatic tire comprising forming an annular carcass by placing on a tire building drum in superposed cencentric relationship at least one circumferentially extending layer of an elastomeric fluid-impervious liner material and at least one circumferentially extending layer of rubber-covered cord ply stock, placing an annulus of inextensible material on each end of said carcass to provide bead cores in the completed tire, turning the edges of the ply stock outwardly relative to the drum and about the bead cores, placing at least one additional circumferentially extending layer of rubber-covered cord ply stock on said drum in superposed contact with the first-mentioned ply stock, turning the edges of the additional ply stock inwardly relative to said drum in overlapping relationship with the outwardly turned ends of the first-mentioned ply stock, applying a separate strip of partially vulcanized rubber over the exterior of the ply stock in each of the bead regions of the carcass with the inner edges of said strips in contact with the edges of the liner material and the outer edges of the strips extending across the bases of the lead regions and to locations on the outer side surfaces thereof, the extent of vulcanization of said strips being such that they have not less than one-third nor more than three-fourths of the tensile strength possessed by fully vulcanized material of like composition, applying rubber tread and sidewall material over the exterior of said carcass with the edges of the sidewall material engaging the outer edges of said strips, removing the uncured tire from the drum, and vulcanizing the tire.

10. The method of making a tubeless pneumatic tire comprising forming an annular carcass by placing on a tire building drum in superposed concentric relationship at least one circumferentially extending layer of an elastomeric fluid-impervious liner material and at least one circumferentially extending layer of rubber-covered cord ply stock, placing an annulus of inextensible material on each end of said carcass to provide bead cores in the completed tire, turning the edges of the ply stock outwardly relative to the drum and about the bead cores, placing at least one additional circumferentially extending layer of rubber-covered cord ply stock on said drum in superposed contact with the first-mentioned ply stock, turning the edges of the additional ply stock inwardly relative to said drum in overlapping relationship with the outwardly turned ends of the first-mentioned ply stock, applying a separate strip of partially vulcanized rubber over the exterior of the ply stock in each of the bead regions of the carcass with the inner edges of said strips in contact with the edges of the liner material and the outer edges of the strips extending across the bases of the bead regions and to locations on the outer surface of the carcass beyond the regions to be engaged by the flanges of a wheel rim on which the completed tire is adapted to be mounted, the extent of vulcanization of said strips being such that they have not less than one-third nor more than three-fourths of the tensile strength possessed by fully vulcanized material of like composition, applying rubber tread and sidewall material over the exterior of said carcass with the edges of the sidewall material engaging the outer edges of said strips, removing the uncured tire from the drum, vulcanizing the tire and, during the vulcanization, molding circumferentially extending sealing ribs in the said strips on the external sides of the bead regions of the tire.

References Cited in the file of this patent

UNITED STATES PATENTS

| | | |
|---|---|---|
| 1,211,351 | Price | Jan. 2, 1917 |
| 1,519,545 | Marquette | Dec. 16, 1924 |
| 2,587,470 | Herzegh | Feb. 26, 1952 |
| 2,645,265 | O'Neil | July 14, 1953 |
| 2,822,026 | Willis | Feb. 4, 1958 |